Jan. 9, 1923.  
G. Q. LEWIS.  
FRICTION SHOCK ABSORBING MECHANISM.  
FILED MAY 7, 1921.
1,441,287.
2 SHEETS—SHEET 1.
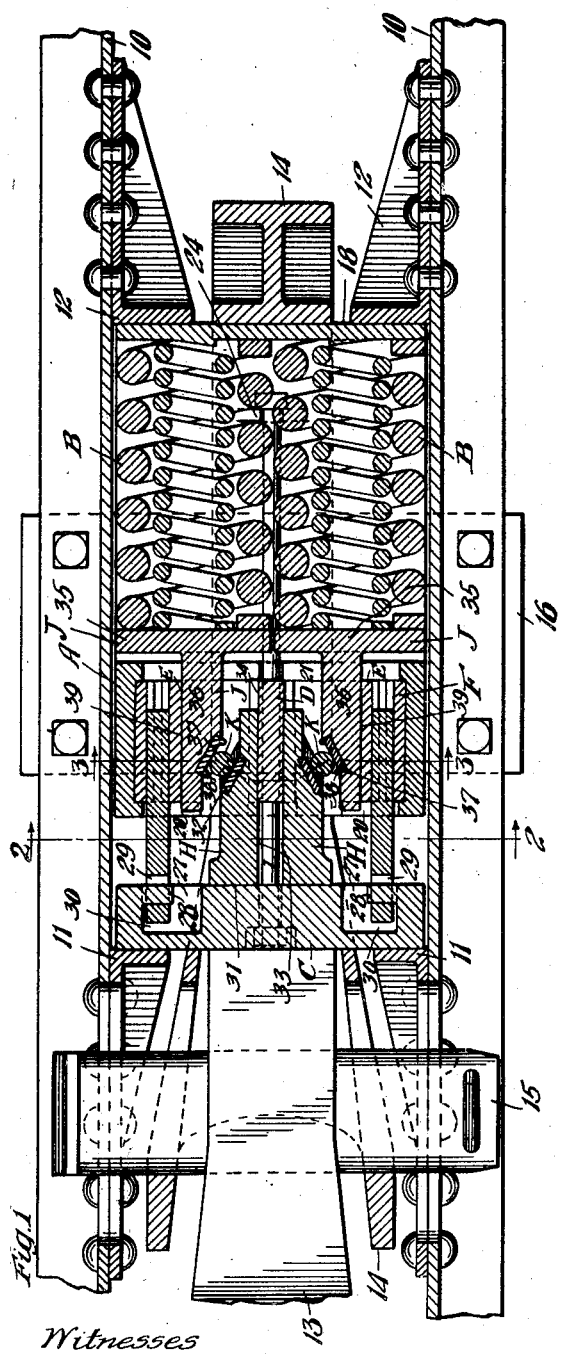
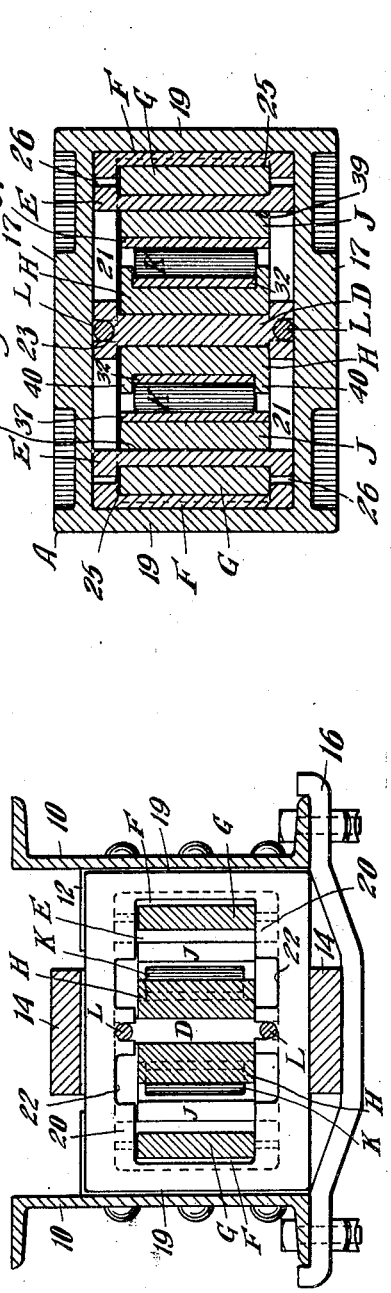
Witnesses  
Wm. Geiger
Inventor  
Goodrich Q. Lewis  
By Geo. I. Haight  
His Atty.

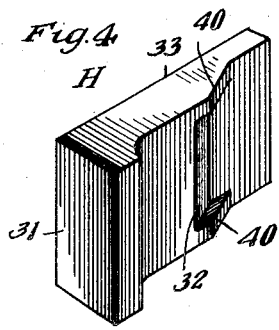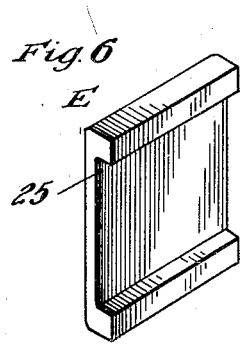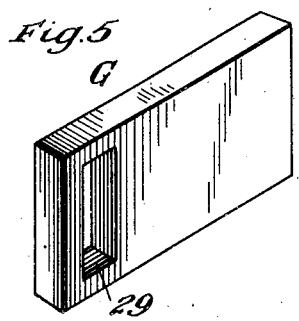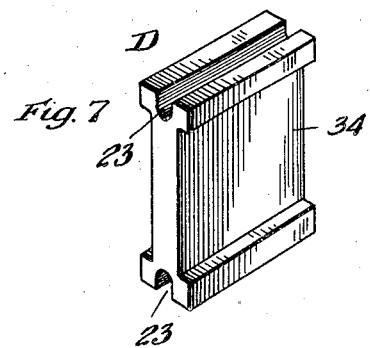

Patented Jan. 9, 1923.

1,441,287

UNITED STATES PATENT OFFICE.

GOODRICH Q. LEWIS, OF WHEATON, ILLINOIS, ASSIGNOR TO WILLIAM H. MINER, OF CHAZY, NEW YORK.

FRICTION SHOCK-ABSORBING MECHANISM.

Application filed May 7, 1921. Serial No. 467,732.

*To all whom it may concern:*

Be it known that I, GOODRICH Q. LEWIS, a citizen of the United States, residing at Wheaton, in the county of Du Page and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a high capacity shock absorbing mechanism especially adapted for railway draft riggings and wherein are obtained certain release, a graduated smooth action, long life, uniform action at all times, low stresses on all friction elements, and low ultimate or peak load transmitted to the car underframe or other supporting framework.

Another object of the invention is to provide a mechanism of the character indicated involving relatively stationary and movable friction plates wherein the movable friction plates are returned to normal position after a compression stroke by means of a follower disposed outside of the member to which the stationary plates are anchored.

Another object of the invention is to provide a mechanism of the character indicated wherein are provided central, outer and intermediate relatively stationary friction plates in combination with slidable friction plates cooperating with each outer and intermediate plate and combined wedge-shoes cooperable with the central plate and each intermediate plate.

Other objects of the invention will more clearly appear from the description hereinafter following.

In the drawings forming a part of this specification, Figure 1 is a horizontal, longitudinal, sectional view of a portion of a railway draft rigging showing my improvements in connection therewith. Figure 2 is a vertical, transverse, sectional view corresponding substantially to the line 2—2 of Figure 1. Figure 3 is an enlarged vertical, transverse, sectional view of the shock absorbing mechanism proper and corresponding to the line 3—3 of Figure 1. And Figures 4, 5, 6 and 7 are detail perspectives of one of the combined wedge-shoes, one of the slidable friction plates, one of the outer stationary friction plates, and the central stationary friction plate, respectively.

In said drawings, 10—10 denote draft sills of a railway car to the inner faces of which are secured front stop lugs 11 and rear stop lugs 12. The inner portion of a drawbar is indicated at 13, the same being operatively associated with the shock absorbing mechanism proper by means of a hooded cast yoke 14 and coupler key 15. The yoke and parts therein are supported in operative position by means of a detachable saddle plate 16.

The shock absorbing mechanism proper, as shown comprises, broadly, a column-load-sustaining member, or shell, or follower A; twin springs B—B; a front main follower C; a central relatively stationary friction plate D; a pair of intermediate relatively stationary friction plates E—E; a pair of outer relatively stationary friction plates F—F; slidable friction plates G—G; a pair of outer combined wedge friction shoes H—H; an inner pair of combined friction shoe-wedge and followers J—J; anti-friction rollers K—K; and retainer bolts L—L.

The column-load-sustaining member A is preferably in the form of a malleable casting having upper and lower horizontally extending walls 17—17, an integral vertical rear wall 18 functioning as a follower in conjunction with the stop lugs 12, and vertical side walls 19—19 at the front end of the member A, said side walls 19 being relatively short in a direction parallel to the axis of the mechanism so as to leave the sides of the member A open for their greater portion to permit insertion and removal of the members J and springs B. From the preceding, it will be seen that the forward end of the member A forms, in effect, a hollow rectangular casing or shell and that between said casing or shell and the rear wall 18 is provided a cage for the twin springs B.

Said casing portion of the member A is so formed as to provide upper and lower transversely extending front flanges 20—20 and rear upper and lower transversely extending flanges 21—21. Said front flanges 20 are notched or cut away on either side of the center line as indicated at 22—22 in Figure 2 to thereby permit insertion and removal of the stationary friction plates D, E and F. The latter are inserted through either set of notches 22 and then shifted transversely into proper position, it being understood that, when so assembled with the member A, the plates D, E and F are anchored against longitudinal movement with respect to the member A but are responsive to laterally applied pressure thereon.

The central friction plate D is of relatively heavy construction and generally of I-cross section as shown in Figure 3. Along its top and bottom edges it is grooved as indicated at 23 to thereby accommodate the retainer bolts L. The latter are anchored at their rear ends to the member A as indicated at 24 in Figure 1 and at their forward ends to the follower C. These bolts maintain the parts in assembled relation and also may be utilized to place the spring resistance under an initial compression.

The intermediate and outer stationary friction plates E and F are of like construction but oppositely arranged when in position, as shown in Figure 3. Each of said plates E and F has a longitudinally extending channel or groove 25 of a width corresponding substantially to the vertical distance between the opposed edges of the flanges 20—20 and 21—21. Said channel grooves 25 provide guideways for the plates G and the thickness of the latter and depth of said grooves 25 are so proportioned that a space is left between the thick edges of the plates E and F as shown at 26 in Figure 3. Said spaces 26 allow the plates E and F to move relatively toward each other both for the purpose of responding to laterally applied pressure and to accommodate such wear as may occur on the cooperating friction surfaces of the plates E, F and G.

The follower C, on its inner side, is cut away near the ends thereof as indicated at 27—27 and inwardly extending lugs or flanges 28—28 are left which extend into correspondingly shaped openings 29—29 in the outer ends of the plates G. The dimension of said openings 29 taken parallel to the center line of the mechanism is greater than the thickness of the lugs 28 and a corresponding clearance is left between the ends of the plates G and the opposed surfaces of the follower C, as shown at 30 to allow of the follower C having a limited movement toward the member A independently of the plates G and without actuating the latter, said limited amount of movement preferably approximating about $\frac{1}{2}''$, for the purpose hereinafter described.

The wedge-friction members H are of like construction and each is formed at its outer end with a transversely extending bearing face 31 arranged to engage the inner side of the follower C; on its outer side, each member H is formed with an inclined wedge roller seat preferably by means of a hardened insert plate 32. On the inner side of each member H is provided a longitudinally extending flat friction surface 33 adapted to frictionally cooperate with the corresponding longitudinally extending friction surface 34 of the central plate D. In this connection, it will be observed that the I-section of the plate D provides channel-shaped guides in the opposite sides thereof for the wedge friction shoes H—H.

The combined wedge-friction-shoe-followers J are of like construction and each has a plate-like spring follower portion proper 35 from which extends forwardly an integral heavy arm 36, the latter constituting the wedge-friction-shoe. Said arm 36, on its inner side, is provided with an inclined wedge roller seat also preferably by means of a hardened plate insert 37. On opposite sides of said plate 37, inwardly extending shoulders 38—38 are formed to cooperate with the rollers K in maintaining the latter in proper relation with respect to the wedges. The outer face of each arm 36 constitutes a longitudinally extending flat friction surface 39 cooperable with the adjacent friction surface of the respective intermediate stationary friction plate E. The rollers K are prevented from endwise or axial movement by any suitable means such as the overhanging flanges 40—40 on the wedge-friction-shoe elements H, as best shown in Figure 3.

The operation of the mechanism is as follows, assuming an inward or buffing movement of the drawbar. As the drawbar 13 moves inwardly, the follower C is compelled to travel in unison therewith. During approximately the first half inch movement of the follower C, the plates G are obviously not actuated but the wedge-friction-shoes H are shifted longitudinally inwardly, thus generating a certain amount of friction between the elements H and the central friction plates D. As the elements H move inwardly, they tend to shift longitudinally relatively to the combined wedge-friction-shoes and followers J, thus setting up the desired lateral augmented pressure on all of the cooperating friction elements. The elements J are forced to move inwardly against the action of the springs B as will be understood. After the follower C and the elements H and J have been actuated as above described during the initial portion of the compression stroke, the follower C engages the plates G and compels the latter to travel inwardly in unison for the remainder of the compression stroke. The end of the compression stroke is determined by the follower C coming into engagement with the member A, the full stroke preferably approximating $2\frac{3}{4}''$.

Upon removal or discontinuance of the actuating force, the springs react through the elements J, forcing the latter and the elements H and follower C outwardly without, initially, inducing any sliding of the plates G. This continues until the follower C has moved approximately a half inch outwardly relatively to the plates G when the latter are picked up, but prior to the picking up and pulling out of the plates G by the follower C, the spreading pressure on the cooperating sets of friction elements will have been reduced to a minimum so that the return of the parts to normal position is rendered certain and immediate. By introducing the antifriction rollers or other suitable anti-friction means between the two sets of elements H and J, the device is rendered extremely sensitive to applied forces and during release.

With the construction shown and described, I am enabled to obtain an exceedingly high capacity, uniform action, and certain release. Because of the large number and area of cooperating friction surfaces, the pressure per unit of area of friction surfaces may be maintained at a comparatively small amount thus minimizing wear and prolonging the life of the mechanism. Another feature of importance in connection with my mechanism resides in the fact that small or minor shocks, which predominate during service conditions, will be taken care of without actuation of the friction plates G, another factor contributing to the long life of the mechanism.

I have herein shown and described what I now consider the preferred manner of carrying out the invention but the same is merely illustrative and I contemplate all changes and modifications that come within the scope of the claims appended hereto.

I claim:

1. In a friction shock absorbing mechanism, the combination with a column-load-sustaining member having a hollow casing portion provided on the interior with opposed outer longitudinally extending friction surfaces, a central friction member providing longitudinally extending friction surfaces on each side, and intermediate longitudinally extending friction members on each side of the central friction member; of a spring resistance; an outer follower movable relatively toward and from said first named member; friction plates longitudinally slidably mounted between each intermediate friction member and one of the adjacent other friction surfaces within said casing; and a lateral-pressure-creating system between each of said intermediate friction members and the remaining adjacent friction surface on the interior of said casing, said pressure-creating systems reacting at one end against said follower and at the other end against said spring resistance.

2. In a friction shock absorbing mechanism, the combination with a column-load-sustaining member having a hollow casing portion provided on the interior with opposed outer longitudinally extending friction surfaces, a central friction member providing longitudinally extending friction surfaces on each side, and intermediate longitudinally extending friction members on each side of the central friction member; of a spring resistance; an outer follower movable relatively toward and from said first named member; friction plates longitudinally slidably mounted between each intermediate friction member and one of the adjacent other friction surfaces within said casing; a lateral-pressure-creating system between each of said intermediate friction members and the remaining adjacent friction surface on the interior of said casing, said pressure-creating systems, reacting at one end against said follower and at the other end against said spring resistance; and cooperable means on said follower and said slidable friction plates so arranged that the follower is adapted to pull said plates when moving in a direction relatively away from said column-load-sustaining member.

3. In a friction shock absorbing mechanism, the combination with a column-load-sustaining member having a hollow casing portion provided on the interior with opposed outer longitudinally extending friction surfaces, a central friction member providing longitudinally extending friction surfaces on each side, and intermediate longitudinally extending friction members on each side of the central friction member; of a spring resistance; an outer follower movable relatively toward and from said first named member; friction plates longitudinally slidably mounted between each intermediate friction member and one of the adjacent other friction surfaces within said casing; and a lateral-pressure-creating system between each of said intermediate friction members and the remaining adjacent friction surface on the interior of said casing, said pressure-creating systems reacting at one end against said follower and at the other end against said spring resistance, each of said systems including a pair of oppositely arranged wedges.

4. In a friction shock absorbing mechanism, the combination with a column-load-sustaining member having a hollow casing portion provided on the interior with opposed outer longitudinally extending friction surfaces, a central friction member providing longitudinally extending friction surfaces on each side, and intermediate longitudinally extending friction members on each side of the central friction member; of a spring resistance; an outer follower movable relatively toward and from said first named member; friction plates longitudinally slidably mounted between each intermediate friction member and one of the adjacent other friction surfaces within said casing; a lateral-pressure-creating system between each of said intermediate friction members and the remaining adjacent friction surface on the interior of said casing, said pressure-creating systems reacting at one end against said follower and at the other end against said spring resistance, each of said systems including a pair of oppositely arranged wedges; and cooperable means on said follower and slidable friction plates so arranged that said follower pulls the plates outwardly from said column-load-sustaining member when the follower moves relatively away therefrom.

5. In a friction shock absorbing mechanism, the combination with a column-load-sustaining member comprising a hollow casing portion having anchored thereto opposed outer longitudinally extending friction members, a central friction member providing longitudinally extending friction surfaces on each side, and intermediate longitudinally extending friction members on each side of the central friction member; of a spring resistance; an outer follower movable relatively toward and from said first named member; friction plates longitudinally slidably mounted between each intermediate friction member and one of the adjacent outer friction members within said casing; a lateral-pressure-creating system between each of said intermediate outer friction members and the remaining adjacent friction member within said casing, said pressure-creating systems reacting at one end against said follower and at the other end against said spring resistance, each of said systems including a pair of oppositely arranged wedges; and anti-friction means interposed between each pair of wedges.

6. In a friction shock absorbing mechanism, the combination with a column-load-sustaining member having a hollow casing portion provided on the interior with opposed outer longitudinally extending friction surfaces, a central friction member providing longitudinally extending friction surfaces on each side, and intermediate longitudinally extending friction members on each side of the central friction member; of a spring resistance; an outer follower movable relatively toward and from said first named member; friction plates longitudinally slidably mounted between each intermediate friction member and one of the adjacent other friction surfaces within said casing; a lateral-pressure-creating system between each of said intermediate friction members and the remaining adjacent friction surface on the interior of said casing, said pressure-creating systems reacting at one end against said follower and at the other end against said spring resistance, each of said systems including a pair of oppositely arranged wedges, cooperable means on said follower and slidable friction plates comprising a lost motion lug and slot connection so arranged that said follower pulls the plates outwardly from said column-load-sustaining member when the follower moves relatively away therefrom; and anti-friction means interposed between each pair of wedges.

7. In a friction shock absorbing mechanism, the combination with a column-load-sustaining member having central, outer, and intermediate friction plates anchored thereto against movement longitudinally thereof, said intermediate plates being freely responsive to laterally applied pressure; of a spring resistance; longitudinally slidable friction plates between said outer and intermediate anchored plates; an outer follower adapted to actuate said slidable friction plates; and a set of combined friction shoes and wedges between said central plate and each of the intermediate plates, each set frictionally cooperating with a central and intermediate plate.

8. In a friction shock absorbing mechanism, the combination with a column-load-sustaining member having central, outer and intermediate friction plates anchored thereto against movement longitudinally thereof, said intermediate plates being freely responsive to laterally applied pressure; of a spring resistance; longitudinally slidable friction plates between said outer and intermediate anchored plates; an outer follower adapted to actuate said slidable friction plates; a set of combined friction shoes and wedges between said central plate and each of the intermediate plates, each set frictionally cooperating with a central and intermediate plate; and spring follower-acting means interposed between the spring resistance and said sets of combined friction-shoes and wedges.

9. In a friction shock absorbing mechanism, the combination with a column-load-sustaining member comprising a spring cage and a casing, of central, outer, and intermediate friction plates anchored within said casing against movement longitudinally thereof, said intermediate plates being freely responsive to laterally applied pressure; a spring resistance within said cage; longitudinally slidable friction plates between said outer and intermediate anchored plates; an outer follower adapted to actuate said slidable friction plates; a set of combined friction shoes and wedges between said central plate and each of the intermediate plates, each set frictionally cooperating with a central and intermediate plate; and anti-friction rollers interposed between said combined friction-shoes and wedges of each set.

10. In a friction shock absorbing mechanism, the combination with a column-load-sustaining member having central, outer and intermediate friction plates anchored thereto against movement longitudinally thereof, said intermediate plates being freely responsive to laterally applied pressure; of a spring resistance; longitudinally slidable friction plates between said outer and intermediate anchored plates; an outer follower adapted to actuate said slidable friction plates; a set of combined friction shoes and wedges between said central plate and each of the intermediate plates, each set frictionally cooperating with a central and intermediate plate; and interlocking cooperable means on said outer follower and said slidable friction plates so arranged that said follower is adapted to pull said plates outwardly when said follower moves relatively away from said load-sustaining member, said means permitting a limited amount of lost motion parallel to the center line of the mechanism between said follower and the slidable friction plates.

In witness that I claim the foregoing I have hereunto subscribed my name this 29th day of Apr. 1921.

GOODRICH Q. LEWIS.

Witnesses:
 CARRIE GAILING,
 ANN BAKER.